US010014778B1

(12) United States Patent
Wei et al.

(10) Patent No.: US 10,014,778 B1
(45) Date of Patent: Jul. 3, 2018

(54) SIBO BUCK-BOOST CONVERTER AND CONTROL METHOD THEREOF

(71) Applicant: BravoTek Electronics Co., Ltd., Zhubei, Hsinchu County (TW)

(72) Inventors: Wei-Hsin Wei, Zhubei (TW); Yu-Shen Lin, Zhubei (TW)

(73) Assignee: BRAVOTEK ELECTRONICS CO., LTD., Zhubei (TW)

( * ) Notice: Subject to any disclaimer, the term of this patent is extended or adjusted under 35 U.S.C. 154(b) by 0 days.

(21) Appl. No.: 15/869,355

(22) Filed: Jan. 12, 2018

(51) Int. Cl.
| G05F 1/00 | (2006.01) |
| H02M 3/158 | (2006.01) |
| H02M 1/08 | (2006.01) |
| H02M 3/157 | (2006.01) |
| H02M 3/155 | (2006.01) |

(52) U.S. Cl.
CPC ........... H02M 3/1582 (2013.01); H02M 1/08 (2013.01); H02M 3/157 (2013.01); H02M 2003/1557 (2013.01)

(58) Field of Classification Search
CPC .. H02M 3/158; H02M 3/1588; H02M 3/1582; H02M 2001/0045; H02M 2001/0067
See application file for complete search history.

(56) References Cited

U.S. PATENT DOCUMENTS

| 6,166,527 A | 12/2000 | Dwelley et al. |
| 7,327,124 B2 | 2/2008 | Liu et al. |
| 2008/0055946 A1 * | 3/2008 | Lesso ............... H02M 3/158 363/63 |

OTHER PUBLICATIONS

Chang-Seok Chae, et al., "A Single-Inductor Step-Up DC-DC Switching Converter With Bipolar Outputs for Active Matrix OLED Mobile Display Panels", IEEE Journal of Solid-State Circuits, vol. 44, No. 2, Feb. 2009, pp. 509-524.
Richtek Technology Corporation, "Power Solution for Wearable AMOLED Products", Feb. 2016, www.richtek.com, 10 pages.
Richtek Technology Corporation, "Triple Output AMOLED Bias", Mar. 2016, www.ricktek.com, 14 pages.
Texas Instruments, "Single-Inductor, Multiple-Output (SIMO) Regulator for AMOLED", SLVS831A—Apr. 2008—Revised Jul. 2008, 21 pages.
Texas Instruments, "TPS65132 Single Inductor—Dual Output Power Supply", SLVSBM1H—Jun. 2013—Revised Nov. 2016, 67 pages.
Texas Instruments, "TPS65135 Single-Inductor, Multiple-Output Regulator", SLVS704C—Nov. 2011—Revised Jan. 2017, 27 pages.

* cited by examiner

*Primary Examiner* — Adolf Berhane
*Assistant Examiner* — Afework Demisse
(74) *Attorney, Agent, or Firm* — Innovation Capital Law Group, LLP; Vic Lin (57) ABSTRACT

Provided is a control method for controlling a SIBO buck-boost converter including a first switch coupled between an input and a first node, a second switch coupled between the first node and GROUND, a third switch coupled between a second node and GROUND, a fourth switch coupled between the second node and a first output node for outputting the positive output, a fifth switch coupled between the first node and a second output node for outputting the negative output, and an inductor coupled between the first node and the second node. The first and the third switches are turned on to energize the inductor. The first and the fourth switches are turned on to generate a positive output. The third and the fifth switches are turned on to generate a negative output.

14 Claims, 6 Drawing Sheets

SIBO BUCK-BOOST CONVERTER AND CONTROL METHOD THEREOF

TECHNICAL FIELD

The disclosure relates in general to a SIBO (Single Inductor Bipolar Output) buck-boost converter and a control method thereof.

BACKGROUND

Mobile systems and displays demand efficient and longer battery usage. Additionally, display quality is the most important performance feature that cannot be compromised even during heavy load current fluctuation, large input voltage transition and switching noise from the DC (direct current)-DC converters.

The active matrix OLED (AMOLED) display becomes very popular for mobile display applications owing to its advantages such as high display quality, low power consumption and low material cost. The AMOLED panel usually requires both positive and negative power supplies with different regulated voltages. The display quality is also depending on the voltage ripple of the two power supplies. Every panel has different output current and voltage levels requirements depending on such as panel size, pixel numbers, display quality and the like.

Figure 1:
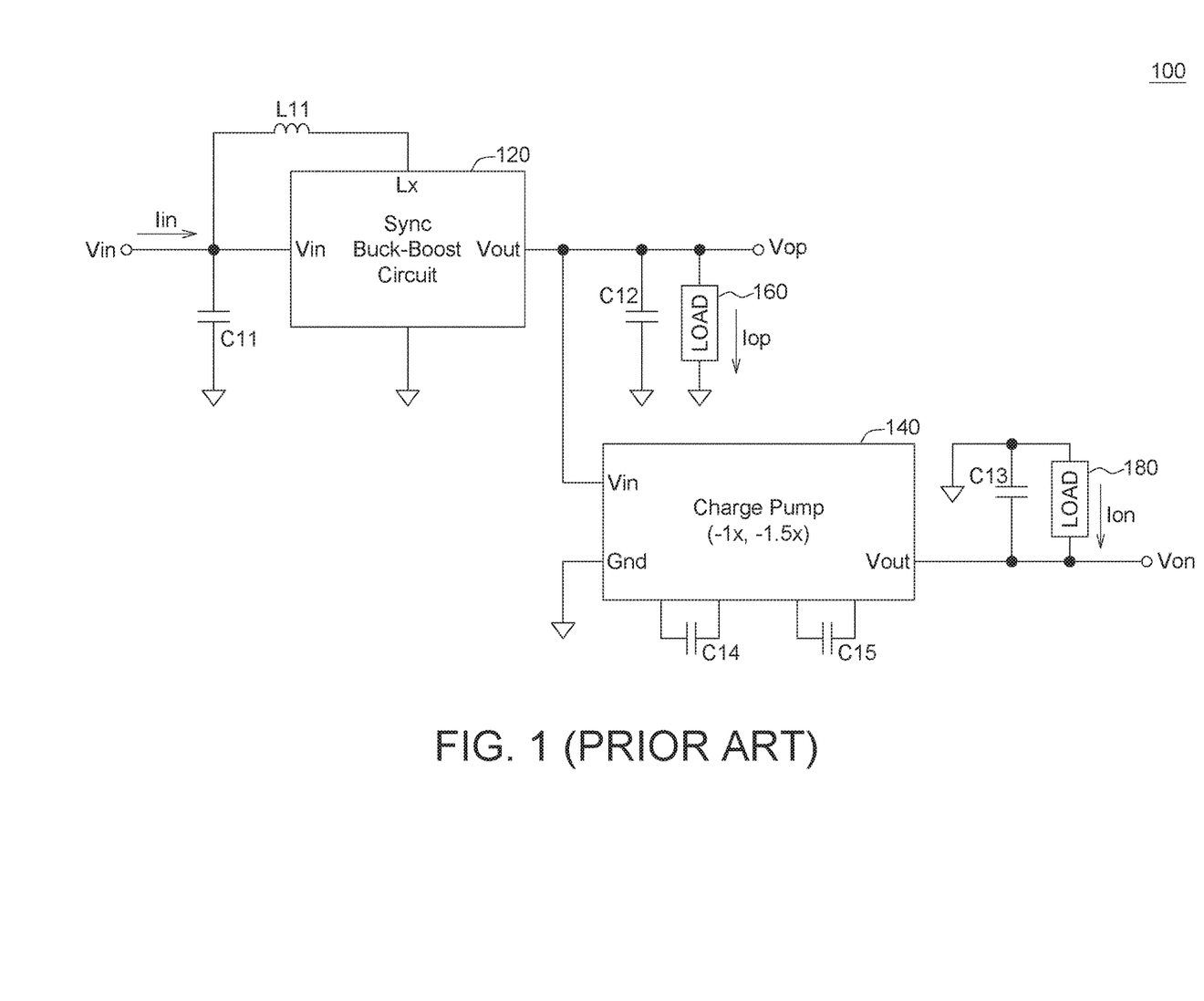
FIG. 1 (prior art) shows a conventional two-stage SIBO converter.

FIG. 1 shows a conventional single inductor AMOLED power supply, which is a two-stage SIBO converter. As shown in FIG. 1, the conventional two-stage SIBO converter 100 includes a synchronous buck-boost circuit 120, a charge pump 140, an inductor L11 and capacitors C11-C15. The capacitors C11-C13 are decoupling capacitors. The capacitors C14-C15 are fly capacitors. The conventional two-stage SIBO converter 100 generates a positive output Vop for driving the load 160 by the positive current Iop, and a negative output Von for driving the load 180 by the negative current Ion. The input provides the input voltage Vin and the input current Iin.

The synchronous buck-boost circuit 120 may operate at buck, buck-boost or boost modes, depending on the input voltage Vin and the output voltage Vop conditions. The input voltage Vin, which is usually provided by a Li-Ion battery, ranges from 3.0V to 4.5V. The output voltage Vop depends on AMOLED panel size, brightness and driver IC, and typical values of the output voltage Vop include 4.6V, 3.3V, 2.8V or 2.5V, etc.

The charge pump 140 is configured to generate the negative output Von from the positive output Vop. The charge pump 140 has many output steps, for example but not limited to −1× and −1.5×. By using the fly capacitor C14, the charge pump 140 may implement the step −1×, that is, Von=Vop*(−1). By using both the fly capacitors C14 and C15, the charge pump 140 may implement the step −1.5×, that is, Von=Vop*(−1.5). The negative output Von may be programmable from around −1× to −1.5× of the positive output Vop for high brightness situation in an AOMLED display.

From FIG. 1, the generation of the positive output Vop and the negative output Von are independently controlled.

Figure 2:
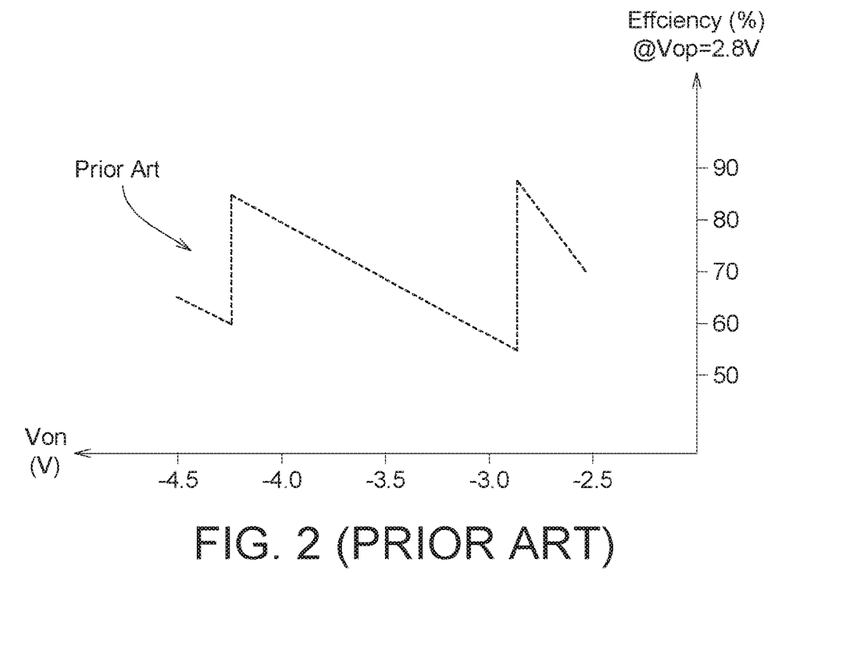
FIG. 2 (prior art) shows the conversion efficiency of the conventional two-stage SIBO converter of FIG. 1.

FIG. 2 shows the conversion efficiency of the two-stage SIBO converter 100. The conversion efficiency Eff is defined as:

$$Eff = \frac{|Iop * Vop| + |Ion * Von|}{|Iin * Vin|} * 100\%$$

As shown in FIG. 2, the efficiency of the conventional two-stage SIBO converter 100 is at peak when Von=Vop*(−1)=2.8*(−1)=−2.8(V) or Von=Vop*(−1.5)=2.8*(−1.5)=−4.2(V) if Vop=2.8(V). However, the efficiency of the conventional two-stage SIBO converter 100 is not good when Von is neither −2.8(V) nor −4.2(V). Therefore, the efficiency of the conventional two-stage SIBO converter needs to be improved.

SUMMARY

There is a need for providing a SIBO buck-boost converter and a control method thereof with improved efficiency.

According to one embodiment of the application, provided is a control method for controlling a SIBO (Single Inductor Bipolar Output) buck-boost converter to supply a positive output and a negative output. The SIBO buck-boost converter includes a SIBO buck-boost inverting power stage including a first switch coupled between an input and a first node, a second switch coupled between the first node and GROUND, a third switch coupled between a second node and GROUND, a fourth switch coupled between the second node and a first output node for outputting the positive output, a fifth switch coupled between the first node and a second output node for outputting the negative output, and an inductor coupled between the first node and the second node. The control method includes: controlling the first and the third switches turned on and the second, the fourth and the fifth switches turned off to energize the inductor in an inductor energizing operation phase; controlling the first and the fourth switches turned on and the second, the third and the fifth switches turned off to generate the positive output in a positive output energizing operation phase; and controlling the third and the fifth switches turned on and the first, the second and the fourth switches turned off to generate the negative output in a negative output energizing operation phase.

According to another embodiment, provided is a SIBO (Single Inductor Bipolar Output) buck-boost converter to supply a positive output and a negative output, the SIBO buck-boost converter including: a SIBO buck-boost inverting controller; and a SIBO buck-boost inverting power stage, coupled to the SIBO buck-boost inverting controller. The SIBO buck-boost inverting power stage includes a first switch coupled between an input and a first node, a second switch coupled between the first node and GROUND, a third switch coupled between a second node and GROUND, a fourth switch coupled between the second node and a first output node for outputting the positive output, a fifth switch coupled between the first node and a second output node for outputting the negative output, and an inductor coupled between the first node and the second node. The SIBO buck-boost inverting controller controls the first and the third switches turned on and the second, the fourth and the fifth switches turned off to energize the inductor in an inductor energizing operation phase. The SIBO buck-boost inverting controller controls the first and the fourth switches turned on and the second, the third and the fifth switches turned off to generate the positive output in a positive output energizing operation phase. The SIBO buck-boost inverting controller controls the third and the fifth switches turned on and the first, the second and the fourth switches turned off to generate the negative output in a negative output energizing operation phase.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENT

Technical terms of the disclosure are based on general definition in the technical field of the disclosure. If the disclosure describes or explains one or some terms, definitions of the terms are based on the description or explanation of the disclosure. Each of the disclosed embodiments has one or more technical features. In possible implementation, one skilled person in the field could selectively implement part or all technical features of any embodiment of the disclosure or selectively combine part or all technical features of the embodiments of the disclosure.

Figure 3:
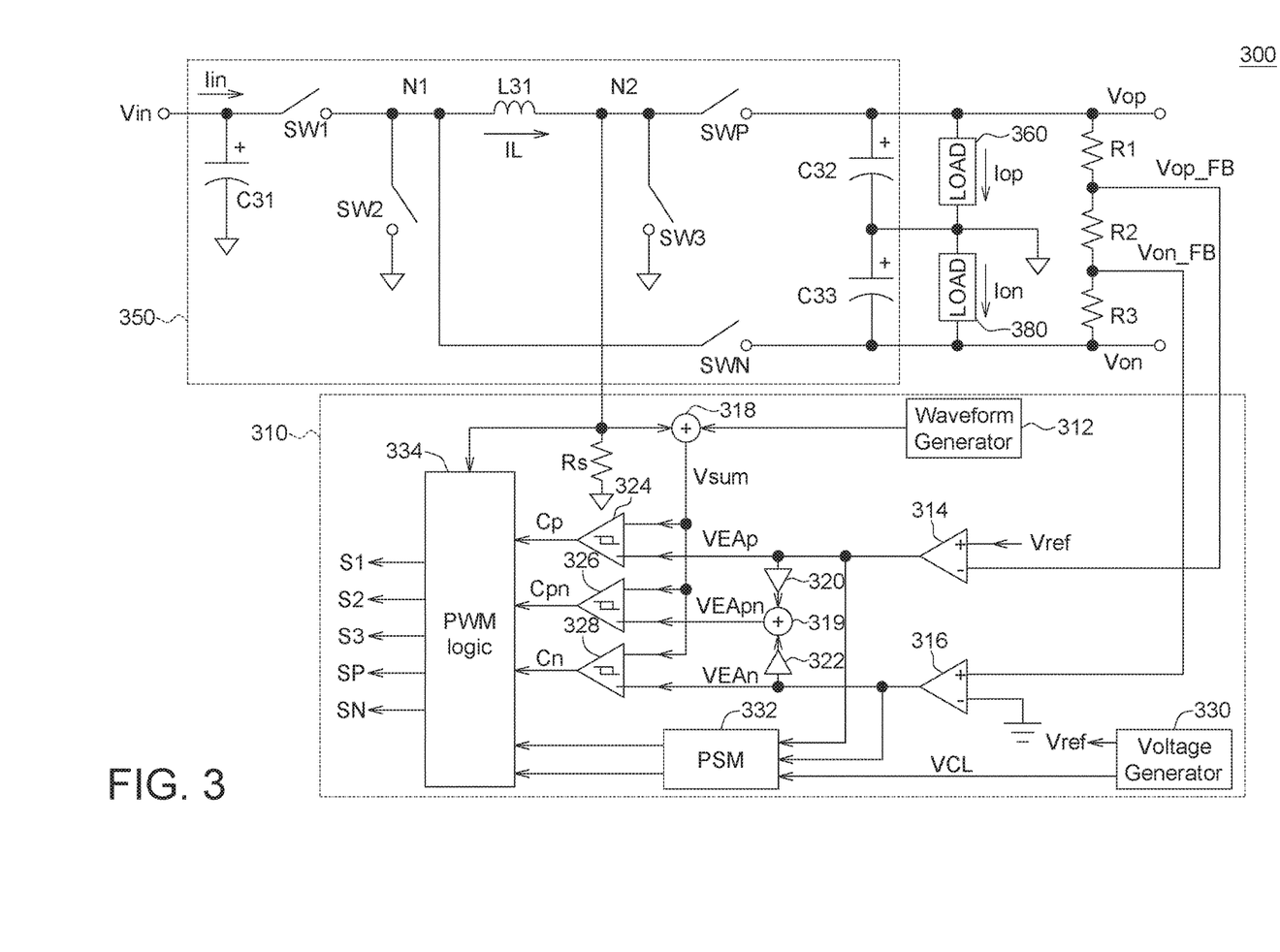
FIG. 3 shows an exemplary circuit of a SIBO buck-boost converter according to one embodiment of the application.

FIG. 3 shows an exemplary circuit of a SIBO (Single Inductor Bipolar Output) buck-boost converter 300 according to one embodiment of the application. The SIBO buck-boost converter 300 includes a SIBO buck-boost inverting controller 310 and a SIBO buck-boost inverting power stage 350.

The SIBO buck-boost inverting controller 310 includes a waveform generator 312, compensated error amplifiers 314, 316, adders 318, 319, buffers 320, 322, comparators 324, 326 and 328, a voltage generator 330, a PSM (pulse skipping mode) circuit 332 and a PWM (pulse width modulation) logic 334.

The waveform generator 312 is coupled to the adder 318. The waveform generator 312 is configured to generate a periodic waveform signal, for example but not limited by, a ramp signal. The periodic waveform signal from the waveform generator 312 is sent to the adder 318.

The compensated error amplifier 314 is coupled to the voltage divider which includes the resistors R1, R2 and R3. The compensated error amplifier 314 is configured to receive a reference voltage Vref and the feedback signal Vop_FB which is related to the positive output Vop. The compensated error amplifier 314 sends the output signal VEAp to the buffer 320, the comparator 324 and the PSM circuit 332. In other words, the output signal VEAp (i.e. the first compensated error amplifier output signal) from the compensated error amplifier 314 is response to the positive output Vop.

Similarly, the compensated error amplifier 316 is coupled to the voltage divider which includes the resistors R1, R2 and R3. The compensated error amplifier 316 is configured to receive ground node GROUND and the feedback signal Von_FB which is related to the negative output Von. The compensated error amplifier 316 sends the output signal VEAn to the buffer 322, the comparator 328 and the PSM circuit 332. In other words, the output signal VEAn (i.e. the second compensated error amplifier output signal) from the compensated error amplifier 316 is response to the negative output Von.

The adder 318 is configured to add the periodic waveform signal from the waveform generator 312 with the voltage IL*Rs, wherein IL refers to the inductor current of the inductor L31. The output signal Vsum (i.e. a sum signal) of the adder 318 is output to the comparators 324, 326 and 328.

The buffers 320 and 322 are configured to buffer the output signals VEAp and VEAn from the compensated error amplifiers 314 and 316, respectively. The outputs of the buffers 320 and 322 are sent to the adder 319.

The adder 319 adds the output signals of the buffers 320 and 322 (i.e. VEAp and VEAn) into the output signal VEApn (i.e. the third compensated error amplifier output signal) which is sent to the comparator 326 (i.e. VEApn=VEAp+VEAn).

The comparator 324 is configured to receive the output signal Vsum from the adder 318 and the output signal VEAp from the compensated error amplifier 314. The comparator 324 sends the output signal Cp (i.e. the first comparison signal) to the PWM logic 334. The output signal Cp goes to logical high when the potential of the signal Vsum is higher than or equal to the output signal VEAp.

The comparator 326 is configured to receive the output signal Vsum from the adder 318 and the output signal VEApn from the adder 319. The comparator 326 sends the output signal Cpn (i.e. a third comparison signal) to the PWM logic 334. The output signal Cpn goes to logical high when the potential of the signal Vsum is higher than or equal to the output signal VEApn.

The comparator 328 is configured to receive the output signal Vsum from the adder 318 and the output signal VEAn from the compensated error amplifier 316. The comparator 328 sends the output signal Cn (i.e. the second comparison signal) to the PWM logic 334. The output signal Cn goes to high when the potential of the signal Vsum is higher than or equal to the output signal VEAn.

The voltage generator 330 is configured to generate the reference voltages Vref and VCL which are sent to the compensated error amplifier 314 and the PSM circuit 332 respectively.

The PSM circuit 332 is configured to receive the output signal VEAp from the compensated error amplifier 314, the output signal VEAn from the compensated error amplifier 316 and the reference voltage VCL from the voltage generator 330. The outputs of the PSM circuit 332 are sent to the PWM logic 334. Details of the PSM circuit 332 are omitted here.

The PWM logic 334 is configured to generate the control signals S1, S2, S3, SP ad SN based on the voltage IL*RS, the output signals Cp, Cpn and Cn (from the comparators 324, 326 and 328) and the output signals from the PSM circuit 332. Details of the PWM logic 334 are omitted here.

The SIBO buck-boost inverting controller 310 is for generating control signals S1, S2, S3, SP and SN based on the positive output Vop, the negative output Von and the inductor current of the inductor L31.

The SIBO buck-boost inverting power stage 350 includes an inductor L31, switches SW1, SW2, SW3, SWP and SWN, and capacitors C31, C32 and C33. The capacitors C31, C32 and C33 are decoupling capacitors.

The switch SW1 is controlled by the control signal S1. The switch SW2 is controlled by the control signal S2. The switch SW3 is controlled by the control signal S3. The switch SWP is controlled by the control signal SP. The switch SWN is controlled by the control signal SN.

The switch SW1 is coupled between an input Vin and a node N1. The switch SW2 is coupled between the node N1 and ground node GROUND. The switch SW3 is coupled between the node N2 and ground node GROUND. The switch SWP is coupled between the node N2 and a first output node for outputting a positive output Vop. The switch SWN is coupled between the node N1 and a second output node for outputting a negative output Von. The inductor L31 is coupled between nodes N1 and N2. The capacitor C31 is coupled between the input Vin and ground node GROUND. The capacitor C32 is coupled between the positive output Vop and ground node GROUND. The capacitor C33 is coupled between the negative output Von and ground node GROUND.

The positive output Vop, which is higher than 0V, is generated on the capacitor C32. The positive output Vop may drive the load 360 by the current Iop. The negative output Von, which is lower than 0V, is generated on the capacitor C33. The negative output Von may drive the load 380 by the current Ion.

Figure 4:
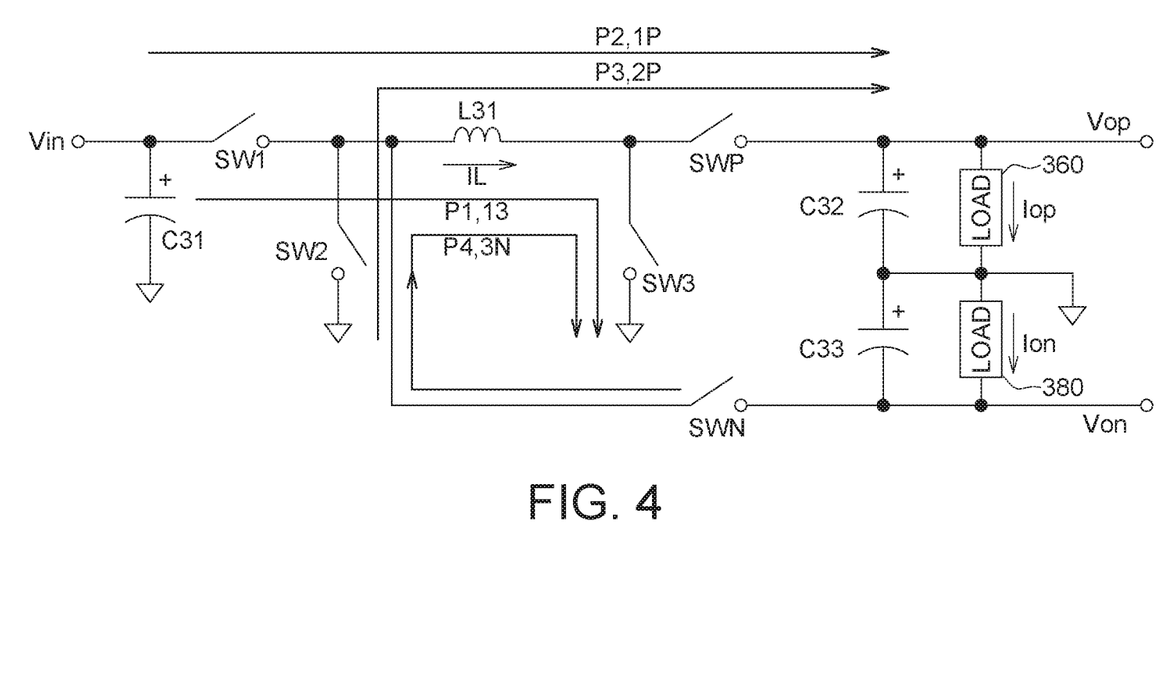
FIG. 4 shows four operation phases P1-P4 of the SIBO buck-boost converter of FIG. 3.
Figure 5:
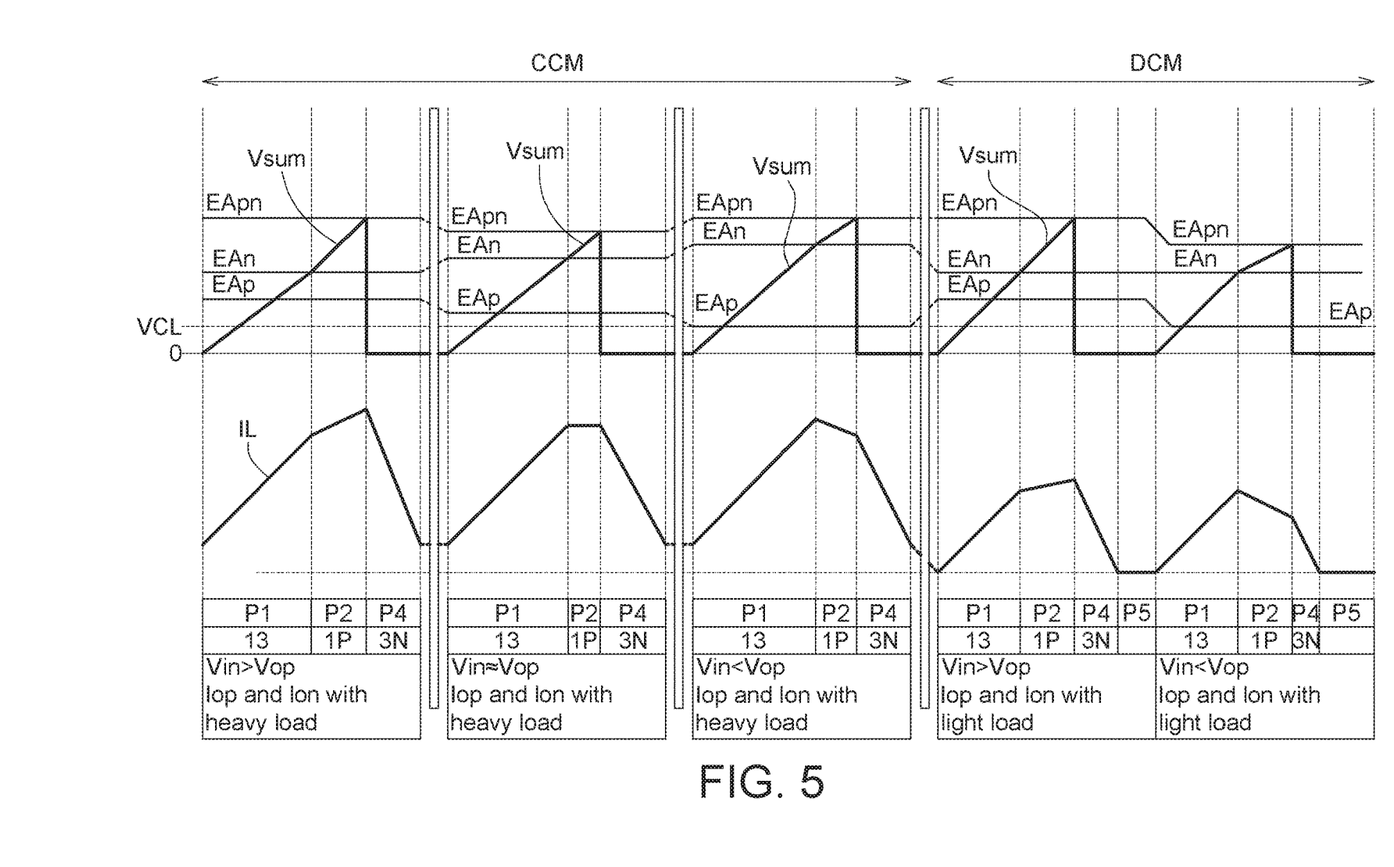
FIG. 5 shows a timing diagram of various signals in the SIBO buck-boost converter of FIG. 3.

FIG. 4 shows four operation phases P1-P4 of the SIBO buck-boost converter 300 of FIG. 3. FIG. 5 shows a timing diagram of various signals (IL, VEAp, VEAn, VEApn and Vsum) in the SIBO buck-boost converter 300 of FIG. 3. As shown in FIG. 5, the SIBO buck-boost converter 300 has two operation modes: continuous conduction mode (CCM) and discontinuous conduction mode (DCM).

In CCM, the inductor current IL from the inductor L31 is continuous. In heavy loading, via the correct feedback control, the SIBO buck-boost converter 300 enters into the CCM mode.

On the contrary, in light loading, via the correct feedback control, the SIBO buck-boost converter 300 enters into the DCM mode. In light loading, the average inductor current IL will be small and may be discharged to 0. When the average inductor current IL reaches around 0, the five switches SW1, SW2, SW3, SWP and SWN are turned on or off to prevent the inductor L31 from being energized until the next clock cycle. This can be done through floating one or two terminals of the inductor L31, or shorting both two terminals of the inductor L31 to the same node. For examples, the switches SW2, SW3, SWP and SWN are turned off and the switch SW1 is turned on. Or, the switches SW1, SWP, and SWN are turned off and the switches SW2 and SW3 are turned on.

Refer to FIG. 4 and FIG. 5. In the first operation phase P1, the switches SW1 and SW3 are turned on and the switches SW2, SWP, SWN are turned off, which is marked as "P1, 13" in FIG. 4. "P1, 13" means that in the first operation phase P1, the switches SW1 and SW3 are turned on. Therefore, in the first operation phase P1, the inductor current IL flows from the input Vin to ground node GROUND through the inductor L31 and the switches SW1 and SW3, by which the inductor L31 is energized. Thus, the first operation phase P1 is an inductor charging operation phase. The duty cycle of the inductor energizing operation phase (i.e. P1) is controlled in response to the feedback signal Von_FB.

In the second operation phase P2, the switches SW1 and SWP are turned on and the switches SW2, SW3 and SWN are turned off, which is marked as "P2, 1P" in FIG. 4. "P2, 1P" means that in the second operation phase P2, the switches SW1 and SWP are turned on. Therefore, in the second operation phase P2, the inductor current IL flows from the inductor L31 to ground node GROUND via the switch SP and the capacitor C32. The inductor L31 obtains energy if the input Vin is higher than the output voltage Vop and releases energy if the input Vin is lower than the output voltage Vop. As such, the capacitor C32 is charged and the positive output Vop is generated thereon. The operation phase P2 is a positive output energizing operation phase. The duty cycle of the positive output energizing operation phase (i.e. P2) is controlled in response to the feedback signals Vop_FB and Von_FB.

In the third operation phase P3, the switches SW2 and SWP are turned on and the switches SW1, SW3 and SWN are turned off, which is marked as "P3, 2P" in FIG. 4. "P3, 2P" means that in the third operation phase P3, the switches SW2 and SWP are turned on. Thus, the third operation phase P3 is an inductor discharging operation phase and the inductor energy discharges from the inductor L31 to the capacitor C32.

In the fourth operation phase P4, the switches SW3 and SWN are turned on and the switches SW1, SW2 and SWP are turned off, which is marked as "P4, 3N" in FIG. 4. "P4, 3N" means that in the fourth operation phase P4, the switches SW3 and SWN are turned on. Therefore, in the fourth operation phase P4, the inductor L31 releases the energy stored thereof and the inductor current IL flows from the inductor L31 to ground node GROUND via the switch SN and the capacitor C33. As such, the capacitor C33 is charged and the negative output Von is generated thereon. The fourth operation phase P4 is a negative output energizing operation phase.

In a fifth operation phase P5 (which is not shown in FIG. 4), at least one of the two terminals of the inductor L31 is floated or the two terminals of the inductor L31 are shorted to each other. For example, the switches SW1, SWP and SWN are turned off and the switches SW2 and SW3 may be turned on or off. The fifth operation phase P5 is a zero inductor current operation phase wherein the inductor is neither charged nor discharged.

FIG. 5 shows five operation modes, i.e. Vin>Vop with heavy load (CCM), Vin≈Vop with heavy load (CCM), Vin<Vop with heavy load (CCM), Vin>Vop with light load (DCM) and Vin<Vop with light load (DCM).

As shown in FIG. 5, in the operation mode Vin>Vop with heavy load (CCM), in the first operation phase P1, the switches SW1 and SW3 are turned on and thus the inductor current IL raises. In the second operation phase P2, the switches SW1 and SWP are turned on, the inductor current IL rises; and the positive output Vop is generated on the capacitor C32. In the fourth operation phase P4, the switches SW3 and SWN are turned on and thus the inductor current IL falls. In the fourth operation phase P4, the negative output Von is generated on the capacitor C33.

Similarly, in the operation mode Vin≈Vop with heavy load (CCM), in the first operation phase P1, the switches SW1 and SW3 are turned on and thus the inductor current IL raises. In the second operation phase P2, the switches SW1 and SWP are turned on, the inductor current IL keeps the same level; and the positive output Vop is generated on the capacitor C32. In the fourth operation phase P4, the switches SW3 and SWN are turned on and thus the inductor current IL falls. In the fourth operation phase P4, the negative output Von is generated on the capacitor C33.

Similarly, in the operation mode Vin<Vop with heavy load (CCM), in the first operation phase P1, the switches SW1 and SW3 are turned on and thus the inductor current IL raises. In the second operation phase P2, the switches SW1 and SWP are turned on, the inductor current IL falls; and the positive output Vop is generated on the capacitor C32. In the fourth operation phase P4, the switches SW3 and SWN are turned on and thus the inductor current IL falls. In the fourth operation phase P4, the negative output Von is generated on the capacitor C33.

In the operation mode Vin>Vop with light load (DCM), the operation phases P1, P2 and P4 are similar to the operation mode Vin>Vop with heavy load (CCM). However, after the fourth operation phase P4, the inductor current IL reaches around zero. In the fifth operation phase P5, energizing the inductor L31 is prevented by floating at least one terminal of the inductor L31 or connecting both terminals of the inductor L31 together.

Similarly, in the operation mode Vin<Vop with light load (DCM), the operation phases P1, P2 and P4 are similar to the operation mode Vin<Vop with heavy load (CCM). However, after the fourth operation phase P4, the inductor current IL reaches around zero. In the fifth operation phase P5, energizing the inductor L31 is prevented by floating at least one terminal of the inductor L31 or connecting both terminals of the inductor L31 together.

Therefore, in the embodiment of the application, duty cycles of all switches SW1, SW2, SW3, SWP and SWN are controlled by responding to the two feedback signals (Vop_FB and Von_FB) and the inductor current IL.

In heavy load (CCM), control sequence is P1, P2 and P4, wherein the first operation phase P1 starts at beginning of each clock cycle and ends at the rising edge of the signal Cn (i.e. Vsum reaches VEAn); the second operation phase P2 starts at end of the first operation phase P1 and ends at the rising edge of the signal Cpn (i.e. Vsum reaches VEApn); and the fourth operation phase P4 starts at end of the second operation phase P2 and ends at the beginning of the next clock cycle.

In light load (DCM), control sequence is P1, P2, P4 and P5, wherein the first operation phase P1 starts at beginning of each clock cycle and ends at the rising edge of the signal Cn (i.e. Vsum reaches VEAn); the second operation phase P2 starts at end of the first operation phase P1 and ends at the rising edge of the signal Cpn (i.e. Vsum reaches VEApn); the fourth operation phase P4 starts at end of the second operation phase P2 and ends at the timing when the inductor current IL is discharged to around 0; and the fifth operation phase P5 starts end of the fourth operation phase P4 and ends at the beginning of the next clock cycle.

An example that the input Vin is provided by a Li battery which has an initial voltage Vin=4.2V and the desired positive output Vop=3.6V is explained. In the beginning, the input Vin is higher than Vop, then the SIBO buck-boost converter 300 of the embodiment is operated under Vin>Vop with heavy load (CCM) condition. After a period of time, as the Li battery provides battery power to the SIBO buck-boost converter 300, the potential of the input Vin drops gradually. When the input Vin drops gradually to almost the same as Vop, the SIBO buck-boost converter 300 of the embodiment is operated under Vin≈Vop with heavy load (CCM) condition. If the potential of the input Vin drops further to lower than Vop, the SIBO buck-boost converter 300 of the embodiment is operated under Vin<Vop with heavy load (CCM) condition.

In brief, in the SIBO buck-boost converter of the embodiment of the application, two output voltages (i.e. the positive output Vop and the negative output Von) are generated via one inductor, a plurality of capacitors and a plurality of switches.

Figure 6:
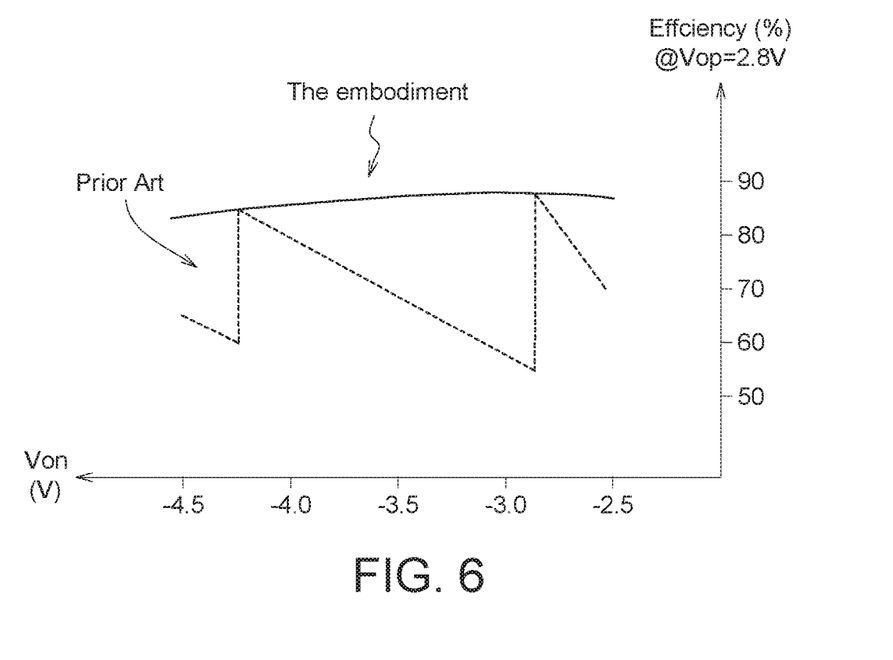
FIG. 6 shows the conversion efficiency comparison between the embodiment and the conventional two-stage SIBO converter.

FIG. 6 shows the conversion efficiency comparison between the embodiment and the conventional two-stage SIBO converter with a case of Vop=2.8V. As shown in FIG. 6, the embodiment has smooth and high conversion efficiency (almost between 85%-88%), compared with the efficiency of the conventional two-stage SIBO converter 100 (which is between 55%-88%). Therefore, the efficiency of the SIBO buck-boost converter is improved significantly.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A control method for controlling a SIBO (Single Inductor Bipolar Output) buck-boost converter to supply a positive output and a negative output, the SIBO buck-boost converter including a SIBO buck-boost inverting power stage including a first switch coupled between an input and a first node, a second switch coupled between the first node and GROUND, a third switch coupled between a second node and GROUND, a fourth switch coupled between the second node and a first output node for outputting the positive output, a fifth switch coupled between the first node and a second output node for outputting the negative output, and an inductor coupled between the first node and the second node, the control method including:
controlling the first and the third switches turned on and the second, the fourth and the fifth switches turned off to energize the inductor in an inductor energizing operation phase;
controlling the first and the fourth switches turned on and the second, the third and the fifth switches turned off to generate the positive output in a positive output energizing operation phase; and
controlling the third and the fifth switches turned on and the first, the second and the fourth switches turned off to generate the negative output in a negative output energizing operation phase.

2. The control method according to claim 1, further including:
when the inductor current goes to near zero, controlling the five switches of the SIBO buck-boost inverting power stage to neither charge nor discharge the inductor in a zero inductor current operation phase.

3. The control method according to claim 2, further including:
generating a first feedback signal that is proportional to the positive output voltage of the SIBO buck-boost converter;
generating a second feedback signal that is proportional to the negative output voltage of the SIBO buck-boost converter;
controlling a duty cycle of the inductor energizing operation phase in response to the second feedback signal; and
controlling a duty cycle of the positive output energizing operation phase in response to the first and the second feedback signals.

4. The control method according to claim 3, further including:
generating a first compensated error amplifier output signal in response to the first feedback signal;
generating a second compensated error amplifier output signal in response to the second feedback signal; and adding the first and the second compensated error amplifier output signals into a third compensated error amplifier output signal.

5. The control method according to claim 4, further including:
generating a periodic waveform signal; and
adding the periodic waveform signal with a voltage related to the inductor current of the inductor into a sum signal.

6. The control method according to claim 5, further including:
comparing the first compensated error amplifier output signal and the sum signal to generate a first comparison signal;
comparing the second compensated error amplifier output signal and the sum signal to generate a second comparison signal; and
comparing the third compensated error amplifier output signal and the sum signal to generate a third comparison signal.

7. The control method according to claim 6, further including:
receiving the first and the second amplifier output signals and a second reference voltage to generate pulse skipping mode output signals; and
generating first, second, third, fourth and fifth control signals for controlling the first, the second, the third, the fourth and the fifth switches based on the first, the second and the third comparison signals and the pulse skipping mode output signals.

8. A SIBO (Single Inductor Bipolar Output) buck-boost converter to supply a positive output and a negative output, the SIBO buck-boost converter including:
a SIBO buck-boost inverting controller; and
a SIBO buck-boost inverting power stage, coupled to the SIBO buck-boost inverting controller, the SIBO buck-boost inverting power stage including a first switch coupled between an input and a first node, a second switch coupled between the first node and GROUND, a third switch coupled between a second node and GROUND, a fourth switch coupled between the second node and a first output node for outputting the positive output, a fifth switch coupled between the first node and a second output node for outputting the negative output, and an inductor coupled between the first node and the second node,
wherein
the SIBO buck-boost inverting controller controls the first and the third switches turned on and the second, the fourth and the fifth switches turned off to energize the inductor in an inductor energizing operation phase;
the SIBO buck-boost inverting controller controls the first and the fourth switches turned on and the second, the third and the fifth switches turned off to generate the positive output in a positive output energizing operation phase; and
the SIBO buck-boost inverting controller controls the third and the fifth switches turned on and the first, the second and the fourth switches turned off to generate the negative output in a negative output energizing operation phase.

9. The SIBO buck-boost converter according to claim 8, wherein:
when the inductor current goes to near zero, the SIBO buck-boost inverting controller controls the five switches of the SIBO buck-boost inverting power stage to neither charge nor discharge the inductor in a zero current operation phase.

10. The SIBO buck-boost converter according to claim 9, wherein the SIBO buck-boost inverting controller is configured for:
generating a first feedback signal that is proportional to the positive output voltage of the SIBO buck-boost converter;
generating a second feedback signal that is proportional to the negative output voltage of the SIBO buck-boost converter;
controlling a duty cycle of the inductor energizing operation phase in response to the second feedback signal; and
controlling a duty cycle of the positive output energizing operation phase in response to the first and the second feedback signals.

11. The SIBO buck-boost converter according to claim 10, wherein the SIBO buck-boost inverting controller includes:
a first compensated error amplifier generating a first compensated error amplifier output signal in response to the first feedback signal;
a second compensated error amplifier generating a second compensated error amplifier output signal in response to the second feedback signal; and
a first adder adding the first and the second compensated error amplifier output signals into a third compensated error amplifier output signal.

12. The SIBO buck-boost converter according to claim 11, wherein the SIBO buck-boost inverting controller includes:
a waveform generator generating a periodic waveform signal; and
a second adder adding the periodic waveform signal with a voltage related to the inductor current of the inductor into a sum signal.

13. The SIBO buck-boost converter according to claim 12, wherein the SIBO buck-boost inverting controller includes:
a first comparator comparing the first compensated error amplifier output signal and the sum signal to generate a first comparison signal;
a second comparator comparing the second compensated error amplifier output signal and the sum signal to generate a second comparison signal; and
a third comparator comparing the third compensated error amplifier output signal and the sum signal to generate a third comparison signal.

14. The SIBO buck-boost converter according to claim 13, wherein the SIBO buck-boost inverting controller includes:
a PSM (pulse skipping mode) circuit receiving the first and the second amplifier output signals and a second reference voltage to generate pulse skipping mode output signals; and
a PWM (pulse width modulation) logic generating first, second, third, fourth and fifth control signals for controlling the first, the second, the third, the fourth and the fifth switches based on the first, the second and the third comparison signals and the pulse skipping mode output signals.

* * * * *